United States Patent [19]

Chow

[11] Patent Number: 4,876,777

[45] Date of Patent: Oct. 31, 1989

[54] METHOD TO INCREASE HOT OFFSET TEMPERATURE OF SILICONE FUSER

[75] Inventor: Che C. Chow, Penfield, N.Y.

[73] Assignee: Xerox Corporation, Stamford, Conn.

[21] Appl. No.: 92,343

[22] Filed: Sep. 2, 1987

[51] Int. Cl.⁴ ........................ B32B 31/00; G03G 15/00

[52] U.S. Cl. ........................................ 29/132; 156/86; 156/153; 156/154; 156/187; 156/215; 156/278; 156/279; 430/99; 430/111; 427/387; 427/419.2; 427/419.7; 355/284; 428/36.8; 428/36.91; 428/138; 428/141; 428/162; 428/164; 428/329; 428/332; 428/447; 428/450; 428/469; 428/492

[58] Field of Search ................. 156/215, 86, 294, 310, 156/154, 149, 148, 153, 187, 186, 278, 279, 280, 329; 29/121.2, 132, 110; 118/60; 430/99, 110, 111; 428/447, 450, 327, 328, 329, 339, 330, 139, 36.8, 36.9, 138, 36.91, 332, 448, 469, 492, 131, 138, 161, 164, 141, 162; 427/387, 407.1, 409, 413, 384, 419.1, 419.2, 419.7; 432/60; 355/3 FV

[56] References Cited

U.S. PATENT DOCUMENTS

| | | | |
|---|---|---|---|
| 3,928,521 | 12/1975 | Haren et al. | 156/215 |
| 4,074,001 | 2/1978 | Imai et al. | 428/329 |
| 4,198,739 | 4/1980 | Budinger et al. | 29/132 |
| 4,368,568 | 1/1983 | Watanabe | 29/132 |
| 4,372,246 | 2/1983 | Azar et al. | 29/132 |
| 4,584,747 | 4/1986 | Katterback et al. | 29/132 |
| 4,603,087 | 7/1986 | Ema et al. | 428/447 |
| 4,702,964 | 10/1987 | Hirano | 428/450 |

*Primary Examiner*—Ellis P. Robinson
*Assistant Examiner*—Donald J. Loney
*Attorney, Agent, or Firm*—Ronald F. Chapuran

[57] ABSTRACT

The invention is a method of fabricating a fuser member by securing a generally cylindrical member of rubber around a core, the cylindrical member including metal oxides and having an outer surface with a plurality of holes that trap toner particles, typically in the 30 to 200 micron diameter range, and covering the outer surface of the cylindrical member with a layer of elastomer impregnated with metal oxides, the layer of elastomer filling a majority of the holes in the 30 to 200 micron diameter range and decreasing the number of metal oxide particles exposed on the surface of the cylindrical member.

1 Claim, 1 Drawing Sheet

METHOD TO INCREASE HOT OFFSET TEMPERATURE OF SILICONE FUSER

BACKGROUND OF THE INVENTION

This invention relates generally to fusing systems for pressure fusing tones at elevated temperatures, and more particularly, to a method to increase the hot offset temperature of a silicone rubber fuser.

In order to affix or fuse toner material to a support surface permanently by heat, it is necessary to elevate the temperature of the toner material in order tha t he constituents of the toner material coalesce and become tacky. This action causes the toner to flow to some extent into the fibers or pores of support members. Thereafter, as the toner material cools, solidification of the toner material causes the toner material to be firmly bounded to the support member.

Several approaches to thermal fusing of toner images onto a support material have been described in the prior art and include providing the concomitant application of heat and pressure by a roll pair maintained in pressure contact, a flat or curved plate member in pressure contact with a roll, a felt member in pressure contact with a roll, or any other suitable means. The fusing of the toner takes place when the proper combination of heat, pressure and contact time are provided, the balancing of these parameters being well known in the art and varying according to various factors.

During operation of some fusing systems, the support member is moved through the nip formed by a roll pair. By controlling the heat transfer to the toner, virtually no offset of the toner particles from the copy sheet to the fuser member is experienced under normal conditions. This is because the heat applied to the surface of the fuser member is insufficient to raise the temperature of the surface of the member above the "hot offset" temperature of the toner at which temperature the toner particles in the image areas of the toner liquefy and cause a splitting in the molten toner resulting in "hot offset." Splitting occurs when the cohesive force holding the viscous toner mass together is less than the adhesive forces tending to offset it to a contacting surface such as a fuser roll, belt, or plate.

One arrangement for minimizing the foregoing problems, particularly that which is commonly referred to as offsetting, has been to provide a fuser member with an outer surface to which a release agent such as silicone oil is applied. Various polymer release materials can be used and the release agent may be applied to the fuser member by various means.

Other references of interest are U.S. Pat. No. 4,603,087 disclosing a cross-linked silicone rubber surface layer to provide improved durability in a fusing roll and U.S. Pat. No. 4,074,001 disclosing a silicone rubber surface layer on a fusing roll having a high viscosity component forming a cross-linked structure by curing and a low viscosity component effective to give releasing property to the fusing roll in order to obviate the need for an external releasing agent and to provide a long copy life fusing roll. One difficulty with the prior art methods is that the coatings often produce an uneven fuse operation. Prior art fusing methods often do not recognize the essential causes of hot offset during fusing.

It has been discovered that toner is trapped by the surface holes on the silicone rubber fuser at the hot offset temperature. To a lesser extent, surface defects such as cracks, crevasse and grinding marks also degrade the release performance. These surface holes are generally the result of tearing of the elastomer on grinding to achieve the proper roll dimensions.

SUMMARY OF THE INVENTION

It is an object of the present invention, therefore, to provide a new and improved method to increase the hot offset temperature of a silicone rubber fuser. It is another object of the present invention is to provide a surface layer that fills the holes on the fuser roll silicone rubber surface while at the same time does not increase the minimum fusing temperature, but rather increases the fusing range between the minimum fusing temperature and the hot offset temperature. Further objects and advantages of the present invention will become apparent as the description proceeds and the features of novelty characterizing the invention will be pointed out with particularity in the claims annexed to and forming a part of the specification.

Briefly, the present invention is a method of fabricating a fuser member by securing a generally cylindrical member of rubber around a core, the cylindrical member embedded with metal oxides on the surface and having an outer surface with a plurality of holes, arising out of the grinding/sanding operation, typically in the 30 to 200 micron diameter range that trap toner particles, and covering the outer surface of the cylindrical member with a layer of elastomer impregnated with metal oxides, the layer of elastomer filling a majority of the holes in the 30 to 200 micron diameter range and decreasing the number of metal oxide particles exposed on the surface of the cylindrical member.

BRIEF DESCRIPTION OF THE DRAWINGS

For a better understanding of the present invention, reference may be made to the accompanying drawings wherein the same reference numerals have been applied to like parts and wherein.

DESCRIPTION OF THE PREFERRED EMBODIMENTS

Figure 1:
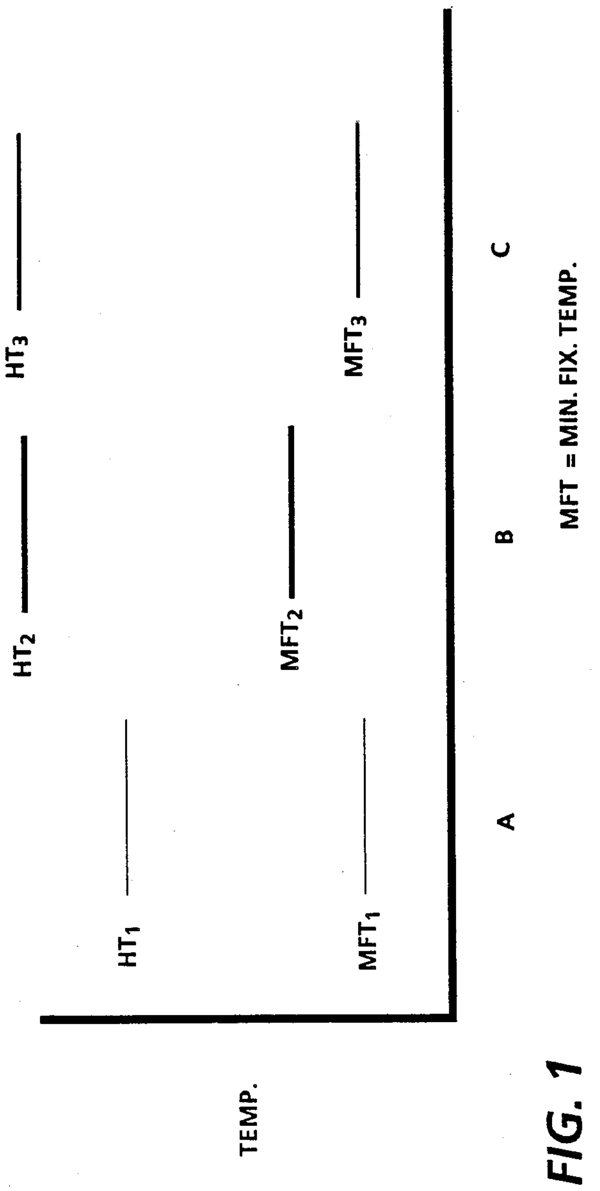
FIG. 1 is a diagram illustrating the increase in the fusing range in a fuser in accordance with present invention.

With reference to FIG. 1, in column A there is illustrated a typical fusing temperature range of a typical Room Temperature Vulcanized (RTV) silicone fuser roll having embedded metal oxide particles from the minimum fixed temperature $MFT_1$ to hot offset temperature $HT_1$. The minimum fixed temperature is the minimum temperature needed for the toner particles to coalesce and adhere to the copy sheet. The hot offset temperature is the temperature at which the toner particles begin to adhere to the fuser roll other than to the copy sheet. It is preferable to keep the minimum fix temperature as low as possible to conserve energy and to raise the hot offset temperature as high as possible to minimize the possibility of hot offset.

It has been discovered that toner is trapped by the surface holes on a silicone rubber fuser roll, that has been grinded and sanded to the proper dimension, at the hot offset temperature. Therefore, in accordance with the present invention, the surface defects or holes on a fuser roll are filled with a silicone elastomer to prevent fuser hot offset. Holes in the range of 30 to 200 microns produced by grinding and sanding the fuser roll generally have the highest tendency to trap toner. Column B illustrates an RTV silicone coating layer on the silicone fuser roll illustrated in Column A, the RTV coating layer having no embedded oxide particles. This is one method to eliminate the surface defect. As illustrated, the effect is to merely raise the fusing temperature range to a higher temperature, the range from $MFT_2$ to $HT_2$. The removal of the toner traps by this method, as illustrated, increases the minimum fuse temperature by approximately 20° to 30° F. even when the coating is less than 1 mil thick. The RTV silicone coating merely provides a layer of heat insulator on the surface of the fusing roll.

As illustrated in column C, in accordance with the present invention, the silicone fuser roll has been coated with a layer of metal oxide containing RTV which fills the surface toner traps thus raising the hot offset temperature to a level $HT_3$ beyond the level $HT_1$. But as illustrated, the metal oxide, preferably iron oxide and aluminum oxide, in the RTV silicone coating on the entire silicone rubber surface provides essentially the same thermal conductivity as the original rubber in the base layer, thus maintaining the same minimum fix temperature at $MFT_1$. The temperature lever $HT_3$ has increased beyond the hot offset temperature level $HT_1$ while the minimum fix temperature remains at the $MFT_1$ level. Thus, the fusing range has been greatly expanded while maintaining a low level minimum fix temperature. It should be noted that the RTV can contain other conductive particles such as metal nitrides.

Figure 2:
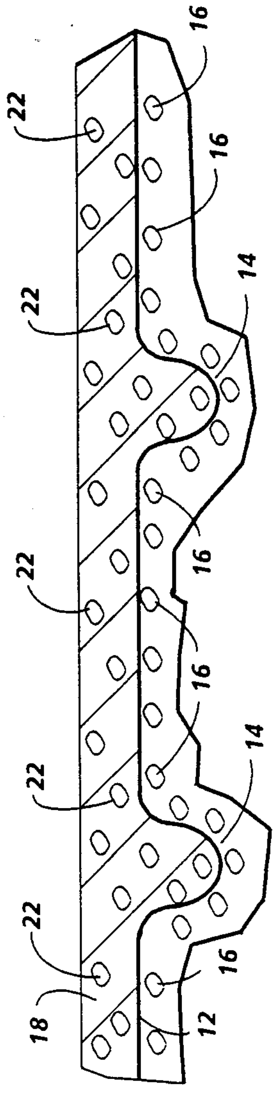
FIG. 2 is an illustration of the surface layer in accordance with the present invention.

The silicone rubber surface illustrated in column C is shown in detail with respect to FIG. 2. The initial silicone rubber surface 12, having a plurality of toner traps or holes, as illustrated at 14, also contains a plurality of iron oxide and aluminum oxide particles 16 evenly dispersed throughout the rubber. A one mil layer of RTV silicone, illustrated at 18, embedded with aluminum oxide and iron oxide particles 22 is applied to the surface of the silicone roll surface 12 to fill the toner traps or holes 14. A uniform concentration of the iron and aluminum oxide particles 22, are dispersed in the 1 mil layer and in the toner traps 14. This provides for an efficient heat transfer along with the elimination of the toner traps 14 to provide a relatively high hot offset temperature $HT_3$ while maintaining a relatively low minimum fusing temperature ($MFT_3 = MFT_1$). Since the thermal conductivity of the two layers are essentially similar, there is no significant change in the minimum fusing temperature.

It should also be noted that if the silicone rubber or other suitable elastomer has a high cross-link density, the size of the toner traps or holes causing toner trapping is reduced. However, the higher cross-link density may increase the modulus of the elastomer, degrading the image quality or release performance. By minimizing or reducing the number of metal oxide particles exposed at the surface and at the same time filling the toner traps, it is possible to maintain the minimum fix temperature and increase the hot offset temperature.

While there has been illustrated and described what at present considered to be a preferred embodiment of the present invention, it will be appreciated that numerous changes and modifications are likely to occur to those skilled in the art, and it is intend in the appended claims to cover all those changes and modifications which fall within the true spirit and scope of the present invention.

I claim:

1. A method of fabricating a fuser member for roll fusing apparatus used in fixing toner images to support sheets, the fuser member having a core, comprising the steps of:

securing a generally cylindrical metal oxide embedded member made of rubber around the core, grinding the cylindrical member to suitable size, the cylindrical member having an outer surface, the outer surface having a plurality of holes, a portion of the holes being in the 30–200 micron diameter range, and coating the outer surface with a layer of RTV silicone impregnated with metal oxide conductive particles, the conductive particles being evenly distributed throughout the elastomer, the layer of elastomer filling said holes in the 30–200 micron diameter range.

* * * * *